United States Patent [19]

Kurose

[11] Patent Number: 5,201,032

[45] Date of Patent: Apr. 6, 1993

[54] METHOD AND APPARATUS FOR GENERATING MULTI-LEVEL CHARACTER

[75] Inventor: Morisumi Kurose, Kawasaki, Japan

[73] Assignee: Ricoh Company, Ltd., Tokyo, Japan

[21] Appl. No.: 742,527

[22] Filed: Aug. 7, 1991

Related U.S. Application Data

[63] Continuation of Ser. No. 341,201, Apr. 21, 1989, abandoned.

[30] Foreign Application Priority Data

Jun. 2, 1988 [JP] Japan .................................. 63-136248

[51] Int. Cl.$^5$ .................................................. G06F 15/20
[52] U.S. Cl. ...................................... 395/150; 395/110
[58] Field of Search ............... 340/729, 730, 733, 734, 340/747, 750; 358/183; 395/150, 151, 110

[56] References Cited

U.S. PATENT DOCUMENTS

| | | | |
|---|---|---|---|
| 3,984,828 | 10/1976 | Beyers, Jr. ................... | 340/804 X |
| 4,186,393 | 1/1980 | Leventer .................... | 340/748 X |
| 4,298,945 | 11/1981 | Kyte et al. .................. | 340/730 X |
| 4,408,198 | 10/1983 | Kudirka ..................... | 340/730 X |
| 4,748,443 | 5/1988 | Uenara et al. ................ | 340/724 X |
| 4,794,451 | 12/1988 | Suzuki et al. ................ | 340/730 X |
| 4,849,746 | 7/1989 | Dubner ....................... | 340/728 |
| 4,851,825 | 7/1989 | Naiman ...................... | 340/735 X |
| 4,947,342 | 8/1990 | Katsura et al. ............... | 340/790 X |
| 5,003,303 | 3/1991 | Kellar et al. ................ | 340/730 X |

FOREIGN PATENT DOCUMENTS 41017 of 1978 Japan .
WO8204147 11/1982 PCT Int'l Appl. ................. 340/730

OTHER PUBLICATIONS

Ikarus Manual, Jul. 1983, pp. 1-32.
Bitstream Manual, Guide to Fonts Outlines, Nov. 1984.

*Primary Examiner*—Heather R. Herndon
*Attorney, Agent, or Firm*—Mason, Fenwick & Lawrence

[57] ABSTRACT

A method and apparatus for generating a multi-level character generates a plurality of outlines for one character. The outlines generated for the one character respectively correspond to mutually different levels of tone. By such outlines, the character can be described in three or more levels of tone.

44 Claims, 9 Drawing Sheets

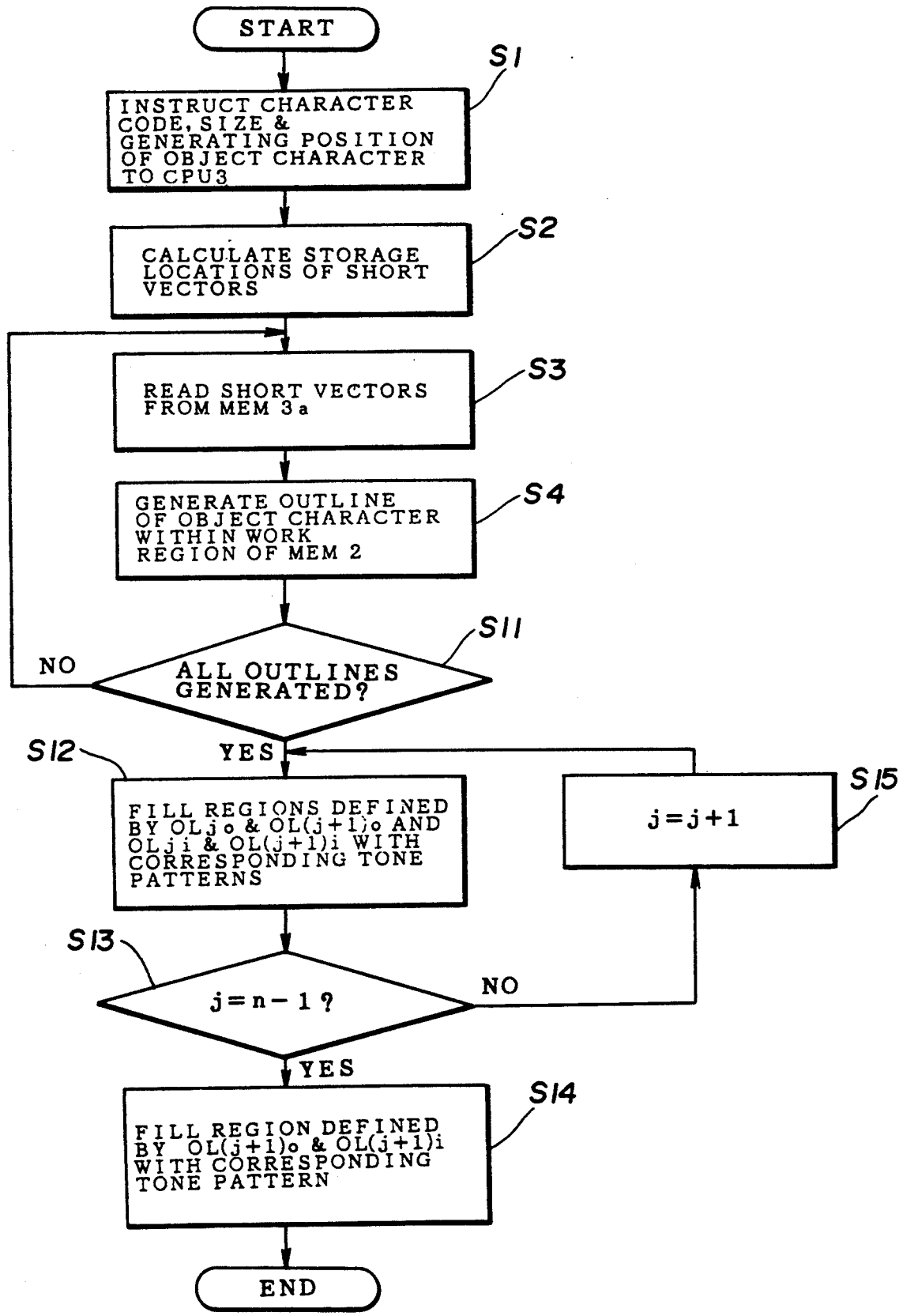

METHOD AND APPARATUS FOR GENERATING MULTI-LEVEL CHARACTER

This application is a continuation of U.S. patent application Ser. No. 07/341,201, filed Apr. 21, 1989, now abandoned.

BACKGROUND OF THE INVENTION

The present invention generally relates to methods and apparatuses for generating characters, and more particularly to a method and apparatus for generating a multi-level character.

Conventionally, a font, that is, a set of characters having the same size and style of penmanship, is generated in two levels of tone. Hence, in the case of a dot printer, for example, each character of the font is printed in black and white where the black shows the shape (or letterform) of the character.

A Japanese Published Patent Application No. 53-41017 shows an example of a conventional system of generating the font. According to this system, an information on an outline (a contour) of each high quality character is stored according to a stroke method. When outputting the stored information, the information is first converted into a dot display signal for dot display and this dot display signal is further converted so that values of each dot signal between two dot signals respectively having a value "1" along a line is converted into a dot signal having a value "1". FIG. 1 shows an example of a character generated by this system, where an arrow denotes a stroke and a hatching denotes a region in which the dot signals all have the value "1". When this character shown in FIG. 1 is printed on the dot printer, for example, the region indicated by the hatching becomes black and the remaining unhatched region becomes white or the color of the paper used.

The above described system is advantageous in that a font of a reasonable quality is obtainable by storing a small quantity of information on each character of the font and that the font can be enlarged or reduced with ease. However, there is a limit to increasing the quality of the font when the font is simply described in two levels of tone which are black and white. Even when the resolution of the printer increases, the printing of a character in two levels of tone cannot produce a character which has additional improved features such as (i) gentle to the human eye, (ii) reduced rigidness of the character and (iii) improved beauty. Therefore, especially in fields in which a relatively large character needs to be finely generated such as laser printer and plotter, a high-resolution cathode ray tube (CRT) and a photographic plate making apparatus, there is a demand to realize a font which has the additional improved features (i) through (iii) described above.

SUMMARY OF THE INVENTION

Accordingly, it is a general object of the present invention to provide a novel and useful method and apparatus for generating multi-level character in which the above described demands are satisfied.

Another and more specific object of the present invention is to provide a method of generating a multi-level character including the step of generating a plurality of outlines for one character, where the outlines generated for the one character respectively correspond to mutually different levels of tone. According to the method of the present invention, it is possible to generate a character which has additional improved features such as (i) gentle to the human eye, (ii) reduced rigidness of the character and (iii) improved beauty.

Still another object of the present invention is to provide a method of generating a multi-level font including the step of generating a plurality of outlines for each character of the font, where the outlines generated for the each character respectively correspond to mutually different levels of tone. According to the method of the present invention, it is possible to generate a font which has additional improved features described above.

A further object of the present invention is to provide an apparatus for generating a multi-level character comprising means for generating a plurality of outlines for one character, where the outlines generated for the one character respectively correspond to mutually different levels of tone. According to the apparatus of the present invention, it is possible to generate a character which has additional improved features described above.

Still another object of the present invention is to provide an apparatus for generating a multi-level font comprising means for generating a plurality of outlines for each character, where the outlines generated for each character respectively correspond to mutually different levels of tone. According to the apparatus of the present invention, it is possible to generate a font which has additional improved features described above.

Still another object of the present invention is to provide a method of automatically generating a multi-level character which is described in more than three levels of tone, the method including the steps of automatically generating a plurality of outlines for the object character to define regions, the outlines substantially separating a character core region from a character background region by forming at least two contour regions between the character core region and the character background region; and filling each of the regions by a tone pattern having a corresponding level of tone, from the more than three levels of tone, to obtain image data of the object character.

Still another object of the present invention is to provide a method of automatically generating a multi-level font which is made up of a set of characters respectively described in more than three levels of tone, the method including the steps of automatically generating a plurality of outlines for the object character to define regions, the outlines substantially separating a character core region from a character background region by forming at least two contour regions between the character core region and the character background region; and filling each of the regions by a tone pattern having a corresponding level of tone, from the more than three levels of tone, to obtain image data of the object character.

Still another object of the present invention is to provide an apparatus for automatically generating a multi-level character which is described in more than three levels of tone, the apparatus including generating means for automatically generating a plurality of outlines for the object character to define regions, the outlines substantially separating a character core region from a character background region by forming at least two contour regions between the character core region and the character background region; and processing means for filling each of the regions by a tone pattern having a corresponding level of tone, from the more than three levels of tone, to output image data of the object character.

Still another object of the present invention is to provide an apparatus for automatically generating a multi-level font which is made up of a set of characters respectively described in more than three levels of tone, the apparatus including generating means for automatically generating a plurality of outlines for the object character to define regions, the outlines substantially separating a character core region from a character background region by forming at least two contour regions between the character core region and the character background region; and processing means for filling each of the regions by a tone pattern having a corresponding level of tone, from the more than three levels of tone, to output image data of the object character.

Other objects and further features of the present invention will be apparent from the following detailed description when read in conjunction with the accompanying drawings.

BRIEF DESCRIPTION OF THE DRAWINGS

FIG. 6 is a flow chart for explaining operations of the central processing units of the apparatus for carrying out a second embodiment of the method of generating multi-level font according to the present invention;

DETAILED DESCRIPTION

A description will be given of a first embodiment of an apparatus for generating a multi-level font according to the present invention by referring to FIG. 2. This first embodiment of the apparatus employs a first embodiment of a method of generating a multi-level font according to the present invention. For convenience' sake, it is assumed that this first embodiment of the apparatus generates a font which is described in three levels of tone.

Figure 1:
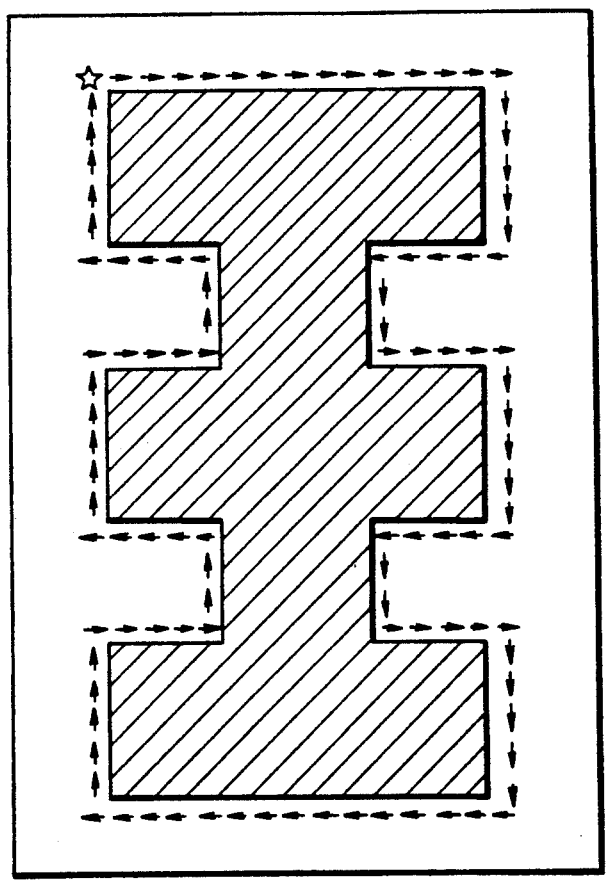
FIG. 1 is a diagram showing an example of a character generated by a conventional system of generating font.
Figure 2:
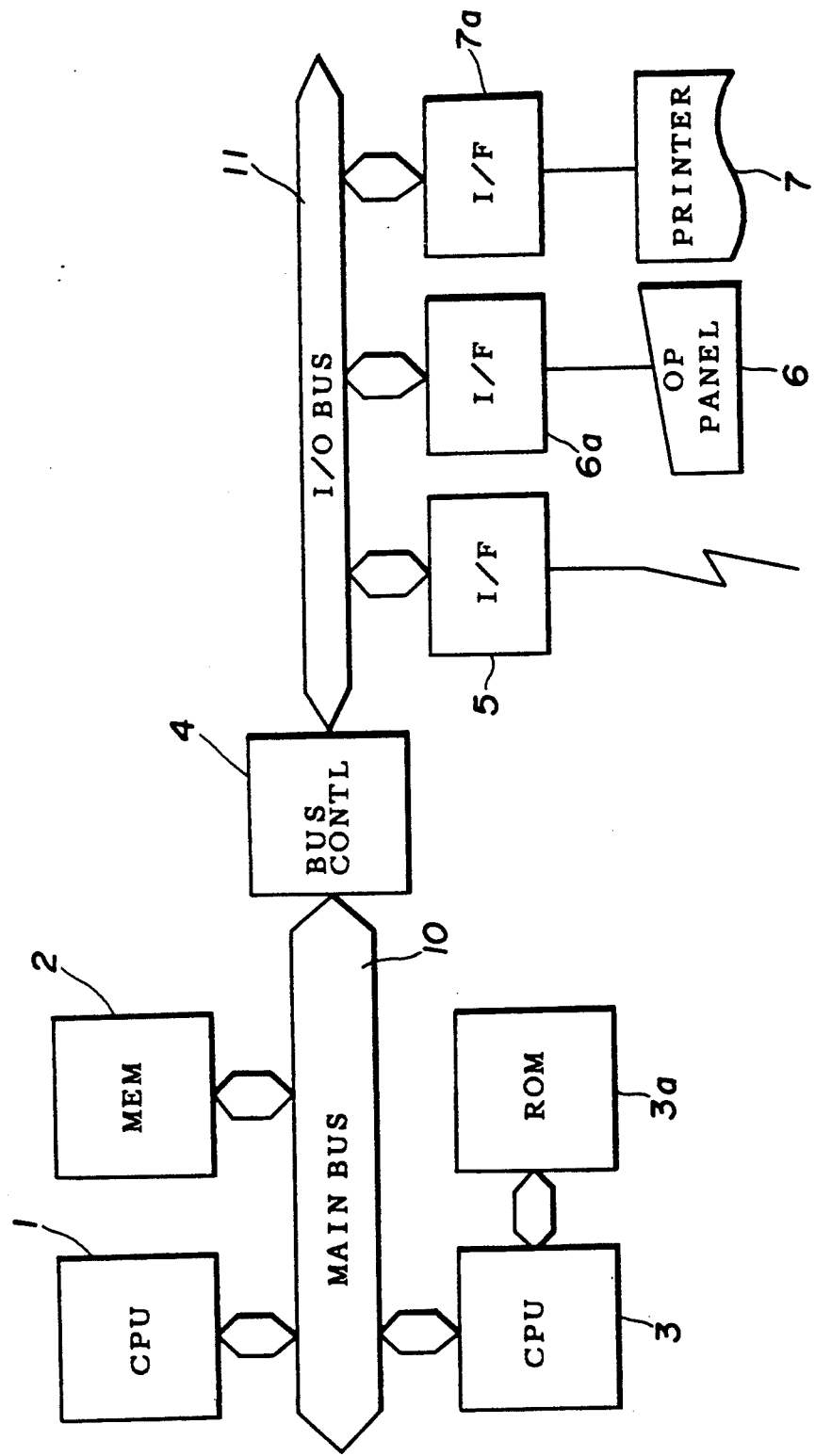
FIG. 2 is a system block diagram showing a first embodiment of an apparatus for generating multi-level font according to the present invention.

In FIG. 2, the apparatus for generating the multi-level font (hereinafter referred to as a font generating apparatus) generally has a central processing unit (CPU) 1 for carrying out a total control of the font generating apparatus, a work memory 2 for storing programs which are executed by the CPU 1, a CPU 3 for generating a font, and a memory 3a for storing information for use in generating a character of the font in the CPU 3. The CPUs 1 and 3 and the work memory 2 are coupled to a bus controller 4 through a main bus 10. The memory 2 may be a random access memory (RAM) or a read only memory (ROM), and the memory 3a is a ROM, for example. In this embodiment, the memory 3a prestores outline vectors, that is, coordinates of short vectors, for each of the characters of the font. The short vectors are rectilinear lines approximating the outline.

A host communication interface 5, an operation panel interface 6a and a printer interface 7a are coupled to the bus controller 4 through an input/output bus 11. The host communication interface 5 couples to the input/output bus 11 a host device such as a word processor (not shown) which is coupled to a printer 7. The printer 7 is a bit mapped printer such as a laser printer and a dot printer, and is coupled to the input/output bus 11 through the printer interface 7a. An operation panel 6 is used for manually controlling the font generating apparatus and displaying modes thereof, and is coupled to the input/output bus 11 through the operation panel interface 6a.

Figure 3:
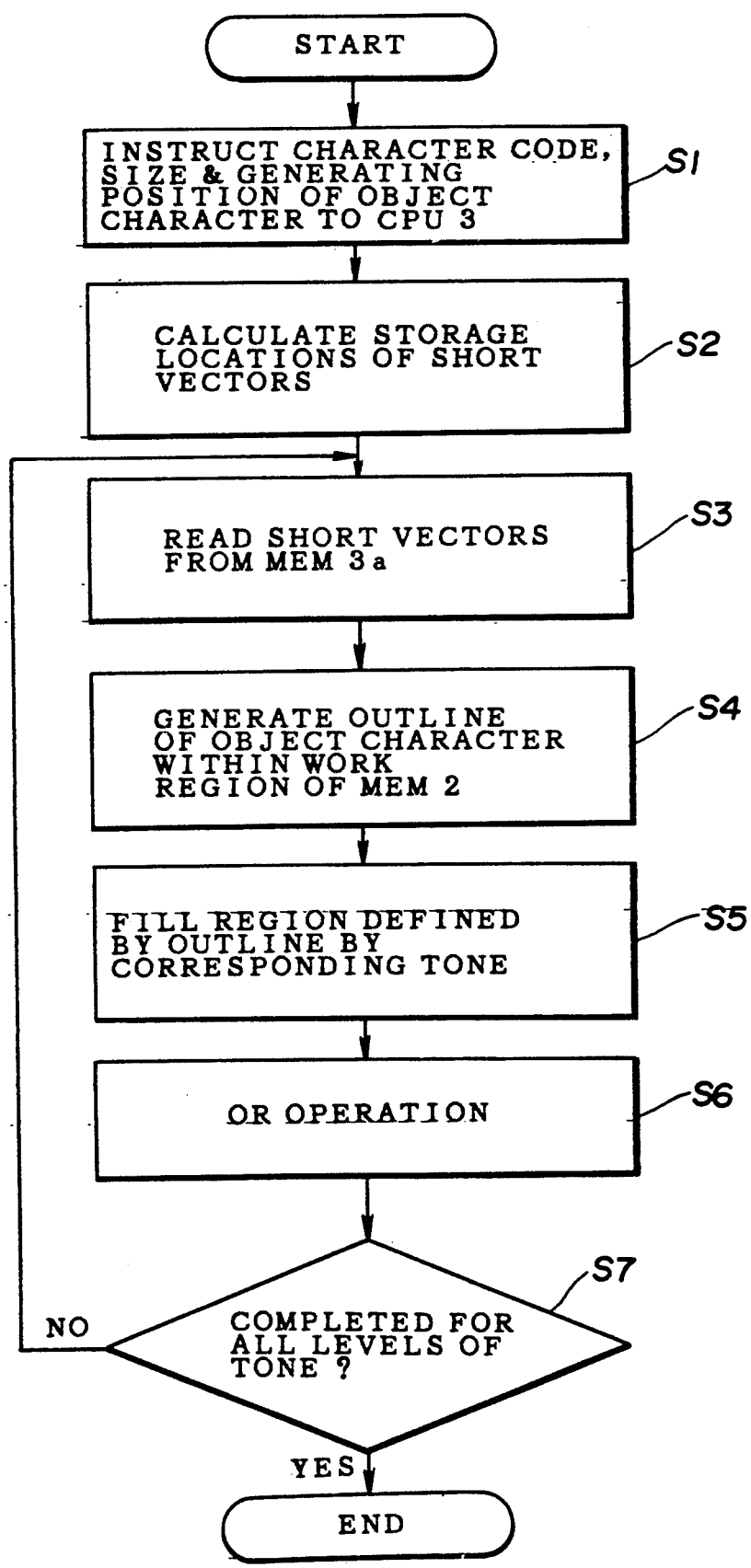
FIG. 3 is a flow chart for explaining operations of central processing units of the apparatus for carrying out a first embodiment of a method of generating multi-level font according to the present invention.

FIG. 3 is a flow chart for explaining operations of the CPUs 1 and 3 for carrying out the first embodiment of the method. In a step S1, the CPU 1 instructs to the CPU 3 a character code, a character size and a generation position of an object character which is to be outputted to the input/output bus 11 responsive to a request or instruction received from the input/output bus 11. For example, the request or instruction to output the object character is entered from the operation panel 6 and the generated object character is outputted and printed on the printer 7.

Then, in a step S2, the CPU 3 calculates storage locations of short vectors of the object character based on the character code. In a step S3, the CPU 3 reads out the short vectors of the object character from the memory 3a using the storage location calculated in the step S2. In a step S4, the CPU 3 generates within a work region of the memory 2 an outline of the object character based on the read short vectors for the designated character size.

Next, in a step S5, the CPU 3 fills a region defined by the outline with a corresponding tone pattern dependent on the outline. In other words, the image data within the region defined by the outline are all set to the same tone which corresponds to the outline. In a step S6, the CPU 3 makes an OR operation on the region filled with the corresponding tone pattern and a designated region of the memory 2 and the result of the OR operation is then stored as this designated region. The designated region is initially a background of the object character, that is, a frame of the object character having a lowest level of tone G0. In a step S7, the CPU 3 discriminates whether or not the process for this object character is completed with respect to all of the levels of tone. The process returns to the step S3 when the discrimination result in the step S7 is NO. On the other hand, the process is ended when the discrimination result in the step S7 becomes YES.

Figure 4:
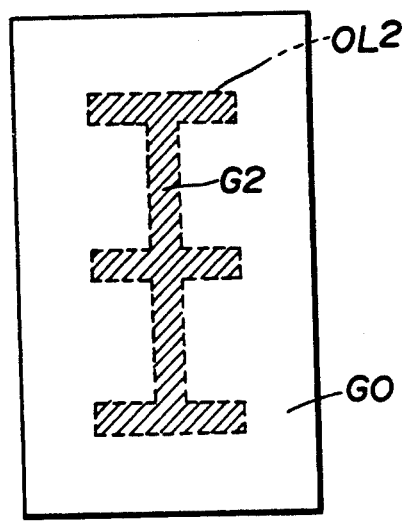
FIGS. 4A through 4C are diagrams for explaining the generation of a multi-level character.
Figure 4B:
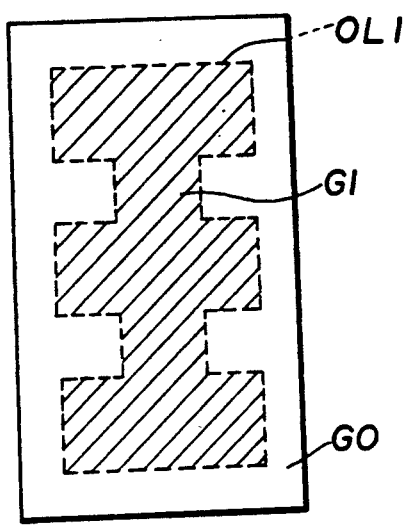
Figure 4C:
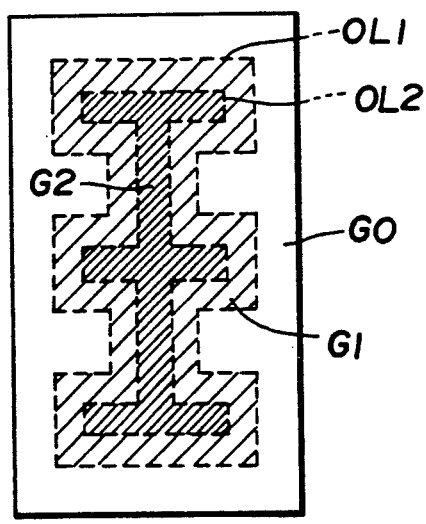

Hence, in this embodiment, a region defined by an outline OL2 shown in FIG. 4A is filled by a corresponding tone pattern having a level of tone denoted by G2 by the steps S3 through S5 carried out for the first time and the step S6 obtains the image shown in FIG. 4A. Then, a region defined by an outline OL1 shown in FIG. 4B is filled by a corresponding tone pattern having a level of tone denoted by G1 by the steps S3 through S5 carried out for the second time. The object character shown in FIG. 4C is obtained by the OR operation carried out in the step S6 after the steps S3 through S5 are carried out for the second time, that is, by substantially overlapping the images shown in FIGS. 4A and 4B. As shown in FIG. 4C, the object character is described in three levels of tone G0, G1 and G2, where the darkness of the tone increases with the subscript value of G. In the case of a printer, for example, the level of tone G0 corresponds to the color of the recording sheet which is usually white, the level of tone G2 corresponds to black, and the level of tone G1 corresponds to gray. However, it is of course possible to assign different colors to the levels of tones.

It is of course possible to fill the region defined by the outline OL1 by the corresponding tone pattern first and then fill the region defined by the outline OL2 by the corresponding tone pattern. The resulting object character obtained by the OR operation, that is, the overlapping of the images shown in FIGS. 4A and 4B, is the same as that shown in FIG. 4C.

When the character is printed or displayed in more than two levels of tone, the tone at the edge portion of the character changes gradually and not suddenly as in the conventional case where only two levels of tone are used. As a result, the printed or displayed character looks natural to the human eye and additional improved features such as (i) gentle to the human eye, (ii) reduced rigidness of the character and (iii) improved beauty are obtainable.

Figure 5A:
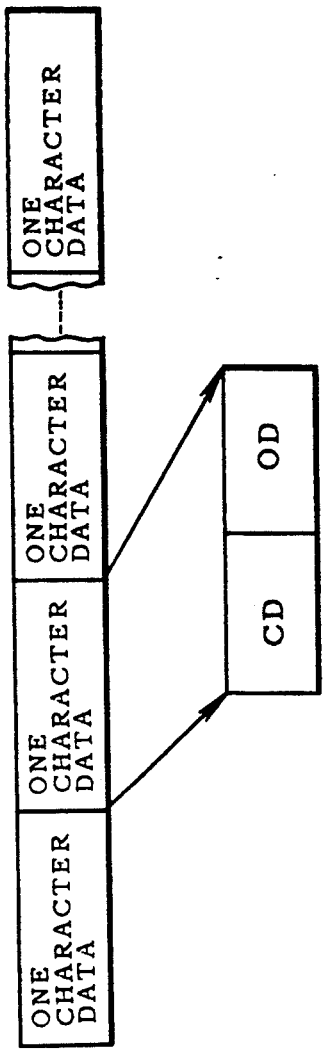
FIGS. 5A and 5B are diagrams for explaining an embodiment of a data format of the multi-level font.
Figure 5B:
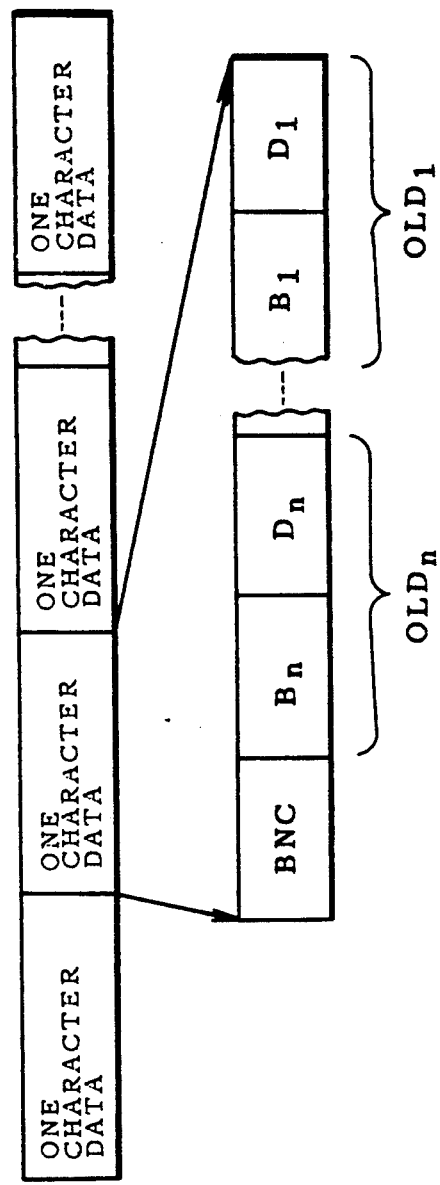

FIGS. 5A and 5B respectively show an embodiment of a data format of the multi-level font. FIG. 5A shows an index block of a fixed length, and one character data is made up of a character code CD and an offset data OD. FIG. 5B shows a data block of a variable length. In FIG. 5B, one character data is made up of a byte number code BNC, and outline data $OLD_{1n}$ through $OLD_0$, where each outline data $OLD_i$ ($i=0, 1, \ldots, n$) is made up of a byte number code $B_i$ and a region data $D_i$. The byte number code $B_i$ contains the number of bytes of the outline data $OLD_i$, and the region data $D_i$ contains the data on the region defined by the outline corresponding to the level of the tone Gi. The multi-level font having such a data format is outputted to the bus controller 4 through the main bus 10 shown in FIG. 2.

Next, a description will be given of a second embodiment of the font generating apparatus according to the present invention. In this embodiment of the apparatus, the block system shown in FIG. 2 can be used. In addition, this embodiment of the apparatus employs a second embodiment of the method of generating the multi-font according to the present invention. For convenience' sake, it is also assumed that this second embodiment of the apparatus generates a font which is described in three levels of tone.

FIG. 6 is a flow chart for explaining operations of the CPUs 1 and 3 shown in FIG. 2 for carrying out the second embodiment of the method. In FIG. 6, those steps which are the same as those corresponding steps in FIG. 3 are designated by the same reference numerals, and a description thereof will be omitted. It is assumed that the object character is "A" and that this object character "A" is to be printed or displayed with three levels of tone as shown in FIG. 7A.

In FIG. 6, a step S11 is carried out after the step S4. This step S11 discriminates whether or not all of the outlines of the object character are generated, and the steps S3 and S4 are repeated until the discrimination result in the step S11 becomes YES. When the discrimination result in the step S11 becomes YES, outlines OL1 and OL2 of the object character "A" shown in FIG. 7B respectively corresponding to levels of tone G1 and G2 are obtained in this embodiment, where the outline OL1 is made up of an outer outline OL1i and an inner outline OL1i and the outline OL2 is made up of an outer outline OL2o and an inner outline OL2o.

A step S12 fills a region defined by the outlines OLjo and OL(j+1)o and a region defined by the outlines OLji and OL(j+1)i with a corresponding tone pattern dependent on the outline OLj, where $j=1, \ldots, n$ and initially "1". n=2 in this embodiment. As a result, the image shown in FIG. 7C is obtained in the step S12. Then, a step S13 discriminates whether or not $j=n-1$. In this case, j=1 which is equal to n−1 and the process advances to a step S14 because the discrimination result in the step S13 is YES. The step S14 fills a region defined by the outlines OL(j+1)o and OL(j+1)i with a corresponding tone pattern dependent on the outline OL(j+1) which is OL2 in this case. As a result, the image shown in FIG. 7A is obtained in the step S14, and the process is ended. On the other hand, when the discrimination result in the step S13 is NO, a step S15 increments the value of j and the process returns to the step S12.

Figure 7:
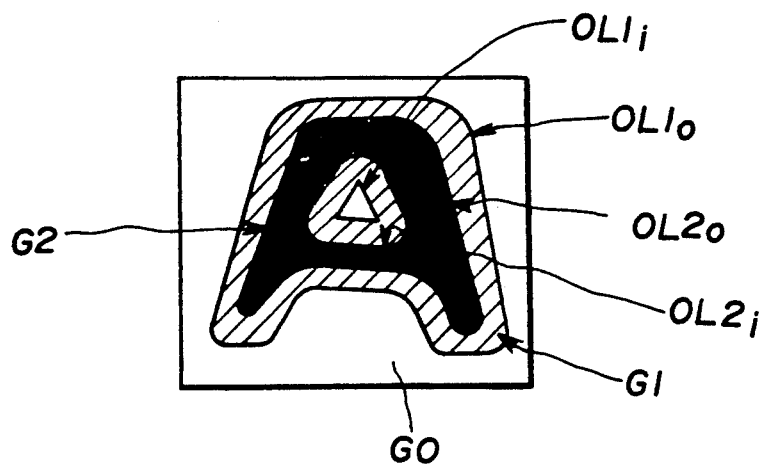
FIGS. 7A through 7C are diagrams for explaining the second embodiment of the method of generating multi-level font according to the present invention.
Figure 7:
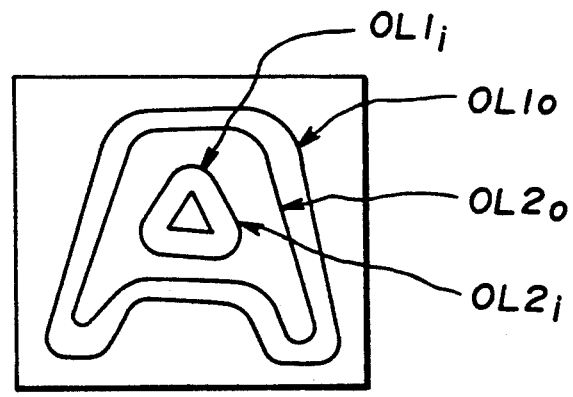
Figure 7:
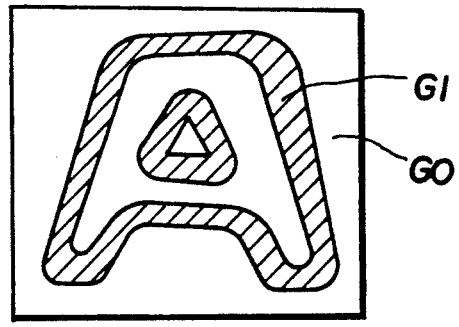

As shown in FIG. 7A, the object character "A" is described in three levels of tone which are G0, G1 and G2, where the darkness of the tone increases with the subscript value of G. The region defined by the outlines OL1o and OL2o and the region defined by the outlines OL1i and OL2i are respectively filled by the tone pattern having the level of tone G1. The region defined by the outlines OL2o and OL2i is filled by the tone pattern having the level of tone G2. In the case of a printer, for example, the level of tone G0 corresponds to the color of the recording sheet which is usually white, the level of tone G2 corresponds to black, and the level of tone G1 corresponds to gray. However, it is of course possible to assign different colors to the levels of tone.

Figure 8:
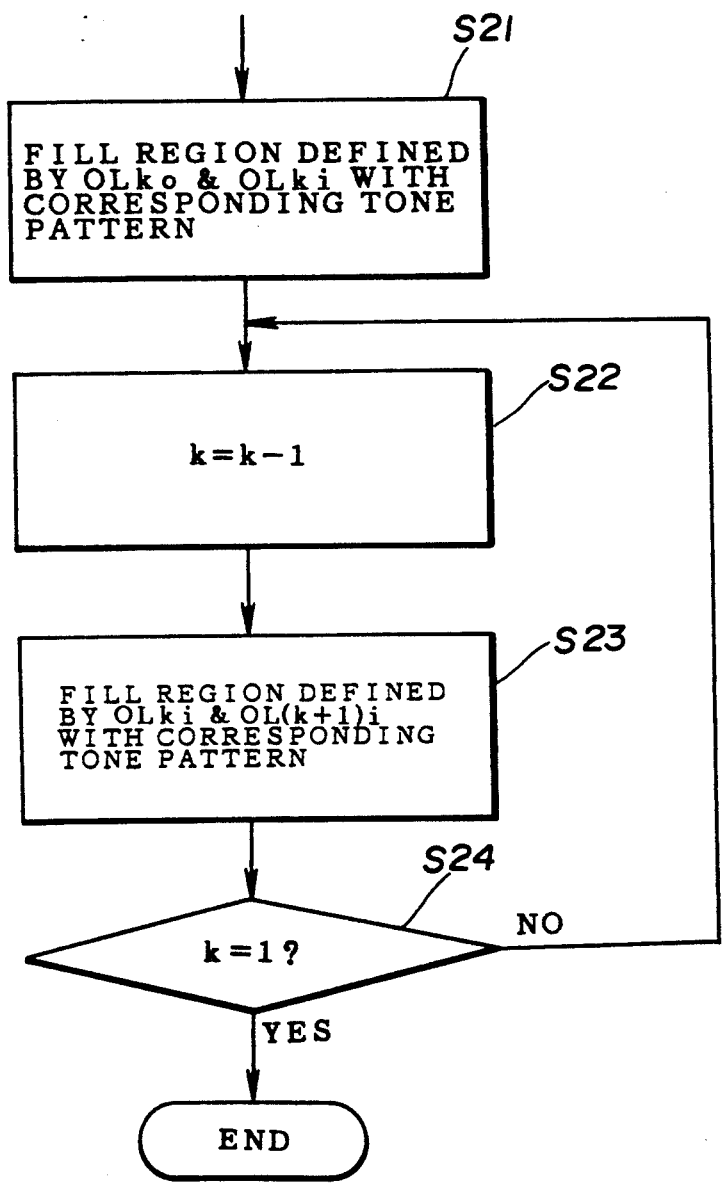
FIG. 8 is a flow chart for explaining essential operations of the central processing units of the apparatus for carrying out a modification of the second embodiment of the method of generating multi-level font according to the present invention.

In this embodiment, the region defined by the outlines OL2o and OL2i is filled by a corresponding tone pattern after the regions respectively defined by the outlines OL2o and OL1o and the outlines OL2i and OL1i. However, the regions may be filled by the corresponding tone patterns in a reverse sequence. FIG. 8 shows a flow chart for explaining a modification of the second embodiment. When the discrimination result in the step S11 is YES, a step S21 fills a region defined by the outlines OLko and OLki, where $k=n, \ldots, 1$ and initially n. n=2 in this modification. A step S22 decrements the value of k, and a step S23 fills a region defined by the outlines OLko and OL(k+1)o and a region defined by the outlines OLki and OL(k+1)i. A step S24 discriminates whether or not k=1. In this modification, the discrimination result in the step S24 is YES and the process is ended. On the other hand, when the discrimination result in the step S24 is NO, the process returns to the step S22.

The effects obtainable in the second embodiment and modification thereof are the same as those obtainable in the first embodiment.

When filling the region defined by the outline in each of the embodiments described heretofore, it is possible to employ various methods. In the present specification, two of such methods are described for the case where the object character is described in three levels of tone.

Figure 9:
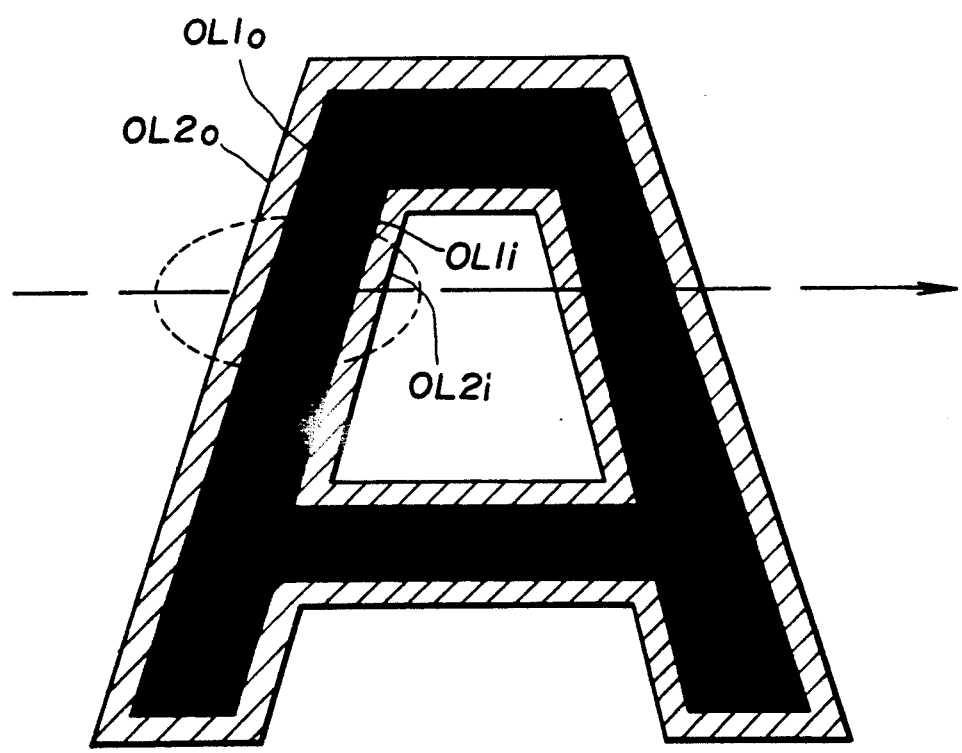
FIG. 9 is a diagram for explaining methods of filling a region defined by the outline.

According to a first method, the data of the object character is scanned in a certain direction as indicated by a phantom line in FIG. 9, for example. When scanning a portion of the object character indicated within a circle, the data of the object character is set to the lowest level of tone G0 while no outline is detected. When the first outline OL2o is detected, the data of the object character is set to the second lowest level of tone G1 until the next outline OL1o is detected. When the outline OL1o is detected, the data of the object character is set to the third lowest level of tone G2 which is the highest and darkest level of tone in this case until the next outline OL1i is detected. When the outline OL1i is detected, the data of the object character is set to the second lowest level of tone G1 until the next outline OL2i is detected. After the outline OL2i is detected, the data of the object character is set to the lowest level of tone G0 until the next outline OL2o is detected and the process is carried out similarly thereafter.

According to a second method, the object character is scanned in a certain direction as indicated by a phantom line in FIG. 9, for example. But according to this method, a predetermined number of picture element data are detected at a time. This predetermined number of picture element data will be referred to as a data group. A number of possible patterns of the group which may occur is prepared in advance as standard group patterns. Each pattern of the group has an outline of occurring at different positions. When one group is detected by the scanning, this detected group is compared with the standard group patterns to discriminate a matching pattern or a pattern which most resembles that of the detected group, and the data of the object character for this detected group is set in conformance with the matching or most closely resembling standard group pattern. The standard pattern groups may be prepared for each level of tone Gi with reference to a level of tone G(i−1) or G(i+1). In addition, it is desirable that the size of the group is set so that more than one change in the level of tone does not occur within one group.

Although the described embodiments use three levels of tone, it is of course possible to provide more than three levels of tone. Moreover, the levels of tone of each of the regions of the object character may be assigned in an opposite manner to that described above by assigning the highest or darkest level of tone to the background of the character and assigning the lowest level of tone to the core portion of the character.

Further, the present invention is not limited to these embodiments, but various variations and modifications may be made without departing from the scope of the present invention.

What is claimed is:

1. A method of generating a multi-level character which is described in more than three levels of tone, said method comprising the steps of:
   receiving an instruction to generate an object character; and
   generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region.

2. The method of generating a multi-level character as claimed in claim 1 which further comprises the step of filling each of the regions by a corresponding tone pattern to obtain an image data of the object character.

3. The method of generating a multi-level character as claimed in claim 2 wherein said step of filling includes a first substep of filling an entire region defined by an outline OLi which corresponds to a level of tone Gi, a second substep of filling an entire region defined by an outline OL(i−1), and a third substep of overlapping image data obtained by the first and second substeps, where i=n, ... , 1 and G0 denotes a lowest level of tone.

4. The method of generating a multi-level character as claimed in claim 2 wherein said step of filling includes a first substep of filling an entire region defined by an outline OLi which corresponds to a level of tone Gi, a second substep of filling an entire region defined by an outline OL(i−1), and a third substep of overlapping image data obtained by the first and second substeps, where i=1, ... , n and G0 denotes a lowest level of tone.

5. The method of generating a multi-level character as claimed in claim 2 wherein said step of filling includes a first substep of filling a region defined by an outline OLi which corresponds to a level of tone Gi, and a second substep of filling a region defined by an outline OL(i+1), where i=1, ... , n and G0 denotes a lowest level of tone.

6. The method of generating a multi-level character as claimed in claim 2 wherein said step of filling includes a first substep of filling a region defined by an outline OLi which corresponds to a level of tone Gi, and a second substep of filling a region defined by an outline OL(i−1), where i=n, ... , 1 and G0 denotes a lowest level of tone.

7. The method of claim 1, further comprising:
   filling the regions with levels of tone that are progressively darker toward a core region of the object character.

8. A method of generating a multi-level font made up of a set of characters respectively described in more than three levels of tone, said method comprising the steps of:
   receiving an instruction to generate an object character of a font; and
   generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region.

9. The method of generating a multi-level character as claimed in claim 8 which further comprises the step of filling each of the regions by a corresponding tone pattern to obtain an image data of the object character.

10. The method of generating a multi-level character as claimed in claim 9 wherein said step of filling includes a first substep of filling an entire region defined by an outline OLi which corresponds to a level of tone Gi, a second substep of filling an entire region defined by an outline OL(i−1), and a third substep of overlapping image data obtained by the first and second substeps, where i=n, ..., 1 and G0 denotes a lowest level of tone.

11. The method of generating a multi-level character as claimed in claim 9 wherein said step of filling includes a first substep of filling an entire region defined by an outline OLi which corresponds to a level of tone Gi, a second substep of filling an entire region defined by an outline OL(i−1), and a third substep of overlapping image data obtained by the first and second substeps, where i=1, ..., n and G0 denotes a lowest level of tone.

12. The method of generating a multi-level character as claimed in claim 9 wherein said step of filling includes a first substep of filling a region defined by an outline OLi which corresponds to a level of tone Gi, and a second substep of filling a region defined by an outline OL(i+1), where i=1, ..., n and G0 denotes a lowest level of tone.

13. The method of generating a multi-level character as claimed in claim 9 wherein said step of filling includes a first substep of filling a region defined by an outline OLi which corresponds to a level of tone Gi, and a second substep of filling a region defined by an outline OL(i−1), where i=n, ..., 1 and G0 denotes a lowest level of tone.

14. The method of claim 8, further comprising:
filling the regions with levels of tone that are progressively darker toward a core region of the object character.

15. An apparatus for generating a multi-level character which is described in more than three levels of tone, said apparatus comprising:
receiving means for receiving an instruction to generate an object character; and
generating means for generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region.

16. The apparatus for generating a multi-level character as claimed in claim 15 wherein said generating means includes memory means for at least storing the outlines of the object character, and processing means for filling each of the regions defined by the outlines read out from said memory means by a corresponding tone pattern to obtain an image data of the object character.

17. The apparatus for generating a multi-level character as claimed in claim 16 wherein said processing means includes first means for filling an entire region defined by an outline OLi which corresponds to a level of tone Gi, second means for filling an entire region defined by an outline OL(i−1), and third means for overlapping image data obtained by the first and second means, where i=n, ..., 1 and G0 denotes a lowest level of tone.

18. The apparatus for generating a multi-level character as claimed in claim 16 wherein said processing means includes first means for filling an entire region defined by an outline OLi which corresponds to a level of tone Gi, second means for filling an entire region defined by an outline OL(i−1), and third means for overlapping image data obtained by the first and second means, where i=1, ..., n and G0 denotes a lowest level of tone.

19. The apparatus for generating a multi-level character as claimed in claim 16 wherein said processing means includes first means for filling a region defined by an outline OLi which corresponds to a level of tone Gi, and second means for filling a region defined by an outline OL(i+1), where i=1, ..., n and G0 denotes a lowest level of tone.

20. The apparatus for generating a multi-level character as claimed in claim 16 wherein said processing means includes first means for filling a region defined by an outline OLi which corresponds to a level of tone Gi, and second means for filling a region defined by an outline OL(i−1), where i=n, ..., 1 and G0 denotes a lowest level of tone.

21. The apparatus of claim 15, further comprising:
processing means for filling each of the regions defined by the outlines with levels of tone that are progressively darker toward a core region of the object character.

22. An apparatus for generating a multi-level font made up of a set of characters respectively described in more than three levels of tone, said apparatus comprising:
receiving means for receiving an instruction to generate an object character of a font; and
generating means for generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region.

23. The apparatus for generating a multi-level character as claimed in claim 20 wherein said generating means includes memory means for at least storing the outlines of the object character, and processing means for filling each of the regions defined by the outlines read out from said memory means by a corresponding tone pattern to obtain an image data of the object character.

24. The apparatus for generating a multi-level character as claimed in claim 22 wherein said processing means includes first means for filling an entire region defined by an outline OLi which corresponds to a level of tone Gi, second means for filling an entire region defined by an outline OL(i−1), and third means for overlapping image data obtained by the first and second means, where i=n, ..., 1 and G0 denotes a lowest level of tone.

25. The apparatus for generating a multi-level character as claimed in claim 23 wherein said processing means includes first means for filling an entire region defined by an outline OLi which corresponds to a level of tone Gi, second means for filling an entire region defined by an outline OL(i−1), and third means for overlapping image data obtained by the first and second means, where i=1, ..., n and G0 denotes a lowest level of tone.

26. The apparatus for generating a multi-level character as claimed in claim 23 wherein said processing means includes first means for filling a region defined by an outline OLi which corresponds to a level of tone Gi, and second means for filling a region defined by an outline OL(i+1), where i=1, ..., n and G0 denotes a lowest level of tone.

27. The apparatus for generating a multi-level character as claimed in claim 23 wherein said processing means includes first means for filling a region defined by an outline OLi which corresponds to a level of tone Gi, and second means for filling a region defined by an outline OL(i−1), where i=n, ..., 1 and G0 denotes a lowest level of tone.

28. The apparatus of claim 22, further comprising:
processing means for filling each of the regions defined by the outlines with levels of tone that are progressively darker toward a core region of the object character.

29. A method of automatically generating a multi-level character which is described in more than three levels of tone, said method comprising the steps of:
receiving an instruction to generate an object character;
automatically generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region; and
filling each of the more than three regions by a tone pattern having a corresponding level of tone, from the more than three levels of tone, to obtain image data of the object character.

30. The method of claim 29, wherein the filling step includes:
filling the regions with levels of tones that are progressively darker toward a core region of the object character.

31. A method of automatically generating a multi-level font which is made up of a set of characters respectively described in more than three levels of tone, said method comprising the steps of:
receiving an instruction to generate an object character of the font;
automatically generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region; and
filling each of the more than three regions by a tone pattern having a corresponding level of tone, from the more than three levels of tone, to obtain image data of the object character.

32. The method of claim 31, wherein the filling step includes:
filling the regions with levels of tones that are progressively darker toward a core region of the object character.

33. An apparatus for automatically generating a multi-level character which is described in more than three levels of tone, said apparatus comprising:
receiving means for receiving an instruction to generate an object character;
generating means, coupled to said receiving means, for automatically generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region; and
processing means, coupled to said generating means, for filling each of the more than three regions by a tone pattern having a corresponding level of tone, from the more than three levels of tone, to output image data of the object character.

34. The apparatus of claim 33, wherein the processing means includes:
means for filling the regions with levels of tones that are progressively darker toward a core region of the object character.

35. An apparatus for automatically generating a multi-level font which is made up of a set of characters respectively described in more than three levels of tone, said apparatus comprising:
receiving means for receiving an instruction to generate an object character of a font;
generating means, coupled to said receiving means, for automatically generating a plurality of outlines for the object character in response to said instruction, said outlines respectively corresponding to mutually different levels of tone, from the more than three levels of tone, of more than three regions which are defined by said outlines, wherein at least two of the more than three regions are contour regions separating a character core region from a character background region; and
processing means, coupled to said generating means, for filling each of the more than three regions by a tone pattern having a corresponding level of tone, from the more than three levels of tone, to output image data of the object character.

36. The apparatus of claim 34, wherein the processing means includes:
means for filling the regions with levels of tones that are progressively darker toward a core region of the object character.

37. A method of automatically generating a multi-level character which is described in more than three levels of tone, said method comprising the steps of:
receiving an instruction to generate an object character;
automatically generating a plurality of outlines for the object character in response to said instruction to define regions, the outlines substantially separating a character core region from a character background region by forming at least two contour regions between the character core region and the character background region; and
filling each of the regions by a tone pattern having a corresponding level of tone, from the more than three levels of tone, to obtain image data of the object character.

38. The method of claim 37, wherein the filling step includes:
filling the regions with levels of tones that are progressively darker toward the core region of the object character.

39. A method of automatically generating a multi-level font which is made up of a set of characters respectively described in more than three levels of tone, said method comprising the steps of:

receiving an instruction to generate an object character of the font;

automatically generating a plurality of outlines for the object character in response to said instruction to define regions, the outlines substantially separating a character core region from a character background region by forming at least two contour regions between the character core region and the character background region; and filling each of the regions by a tone pattern having a corresponding level of tone, from the more than three levels of tone, to obtain image data of the object character.

40. The method of claim 39, wherein the filling step includes:

filling the regions with levels of tones that are progressively darker toward the core region of the object character.

41. An apparatus for automatically generating a multi-level character which is described in more than three levels of tone, said apparatus comprising:

receiving means for receiving an instruction to generate an object character;

generating means, coupled to said receiving means, for automatically generating a plurality of outlines for the object character in response to said instruction to define regions, the outlines substantially separating a character core region from a character background region by forming at least two contour regions between the character core region and the character background region; and processing means, coupled to said generating means, for filling each of the regions by a tone pattern having a corresponding level of tone, from the more than three levels of tone, to output image data of the object character.

42. The apparatus of claim 41, wherein the processing means includes:

means for filling the regions with levels of tones that are progressively darker toward the core region of the object character.

43. An apparatus for automatically generating a multi-level font which is made up of a set of characters respectively described in more than three levels of tone, said apparatus comprising:

receiving means for receiving an instruction to generate an object character of a font;

generating means, coupled to said receiving means, for automatically generating a plurality of outlines for the object character in response to said instruction to define regions, the outlines substantially separating a character core region from a character background region by forming at least two contour regions between the character core region and the character background region;

processing means, coupled to said generating means, for filling each of the regions by a tone pattern having a corresponding level of tone, from the more than three levels of tone, to output image data of the object character.

44. The apparatus of claim 43, wherein the processing means includes:

means for filling the regions with levels of tones that are progressively darker toward the core region of the object character.

* * * * *